United States Patent

[11] 3,609,172

| | | | |
|---|---|---|---|
| [72] | Inventor | Gianfranco Intelisano<br>Milan, Italy | |
| [21] | Appl. No. | 770,081 | |
| [22] | Filed | Oct. 23, 1968 | |
| [45] | Patented | Sept. 28, 1971 | |
| [73] | Assignee | Italchemi-Instituto Chimico Farmaceutico<br>S.r.l.<br>Milan, Italy | |
| [32] | Priority | Oct. 21, 1968 | |
| [33] | | France | |
| [31] | | 126488 | |

[54] NEW STEROID DERIVATIVES
4 Claims, No Drawings

[52] U.S. Cl. .................................................... 260/397.45
[51] Int. Cl. ...................................................... C07c169/32
[50] Field of Search .......................................... 260/397.45;
/Machine Searched Steroids

[56] References Cited
UNITED STATES PATENTS

| | | | |
|---|---|---|---|
| 3,328,431 | 6/1967 | Bowers et al. ................ | 260/397.3 |

Primary Examiner—Elbert L. Roberts
Attorney—Young & Thompson

ABSTRACT: New 21-esters of steroids of formula
St—OCO $(CH_2)_5$—NH—$COCH_3$ wherein St represents a steroid residue from pregnadiene series, the ester group being attached to the carbon at 21- position of the steroid residue. These compounds have a more useful antianaphylactic and antiinflammatory activity than the starting steroids. They are prepared by reacting the suitable steroid with E-acetamido-caproyl chloride in an organic solvent, in the presence of a hydrogen-chloride-binding agent.

NEW STEROID DERIVATIVES

The present invention relates to new 21-esters of steroids having, in particular, anti-anaphylactic and anti-inflammatory activity, of formula $$St-OCO(CH_2)_5-NH-COCH_3 \quad (I)$$

wherein St represents a steroid residue, the ester group being attached to the carbon at the 21-position of the steroid residue.

By "steroid residue" is meant here the residue of a steroid of the pregnadiene series which may carry usual substituents such as chlorine, fluorine, methyl, and the like.

A process for the preparation of compounds of formula (I) is characterized in that the suitable steroid is reacted with ε-acetamido-caproyl chloride in an organic solvent, in the presence of a hydrogen-chloride-binding agent. Suitable organic solvents include in particular chloroform and pyridine. As hydrogen-chloride-binding agent, a tertiary amine such as pyridine, triethylamine, and the like, will be advantageously used. The reaction is usually carried out without external heating.

The following nonlimiting examples are given for the purpose of illustrating the invention.

EXAMPLE 1

Preparation of dexamethasone 21-(ε-acetamido)-caproate

To a solution of 1 g. of dexamethasone in 10 cc. of pyridine are added, at room temperature, 0.609 g. of ε-acetamido-caproyl chloride dissolved in 15 cc. of chloroform.

After standing for a few hours, the solution is completely evaporated and the oily residue is washed with distilled water until substantial solidification thereof is achieved.

The product is then dissolved in ethanol and is then chromatographed on alumina, eluting with ethanol.

The solvent of the chromatographic solution is then removed in vacuo, and the residue is recrystallized from ethyl acetate.

0.676 g. of product melting at 124° C. are obtained.

| Analysis for $C_{30}H_{42}O_7NF$ | | C | H | N |
|---|---|---|---|---|
| | Calculated, % | 65.79 | 7.72 | 2.56 |
| M. W. 547.67 | Found, % | 65.45 | 7.62 | 2.70 |

EXAMPLE 2

Preparation of triamcinolone 21-(ε-acetamido)-caproate

To a solution of 1 g. of triamcinolone in 10 cc. of pyridine is added, at room temperature, a solution of 0.9 g. of εacetamido-caproyl chloride in 15 cc. of chloroform.

The solution is allowed to stand for a few hours and the solvent is then evaporated in vacuo.

The residue is shaken in a sodium bicarbonate solution and is then washed with distilled water. This gives a solid material which is purified by dissolution in acetone and reprecipitation with ethyl ether.

0.944 g. of product melting at 185°–186° C. are obtained.

| Analysis for $C_{29}H_{40}O_8NF$ | | C | H | N |
|---|---|---|---|---|
| | Calculated, % | 63.37 | 7.33 | 2.85 |
| M. W. 549.67 | Found, % | 63.08 | 7.29 | 2.53 |

EXAMPLE 3

Preparation of prednisolone 21-(ε-acetamido)-caproate

To a solution of 1 g. of prednisolone in 10 cc. of pyridine is added a solution of 0.676 g. of ε-acetamido-caproyl chloride in 15 cc. of chloroform.

After allowing to stand for a few hours, the solvent is evaporated in vacuo.

The dense oily residue is added to distilled water and solidifies completely after a few hours.

The resulting solid is purified by chromatography on alumina, eluting with ethanol (95 percent).

The solution resulting from the chromatography is then evaporated in vacuo, to dryness, and the residue is then washed with acetone. Under such conditions, the product passes momentarily into solution and then, almost immediately, precipitates again.

0.8 g. of product melting at 185°–187° C. are obtained.

| Analysis for $C_{29}H_{41}O_7N$ | | C | H | N |
|---|---|---|---|---|
| | Calculated, % | 67.55 | 8.01 | 2.71 |
| M. W. 515.65 | Found, % | 67.29 | 8.00 | 2.92 |

It has been found that compounds of formula (I) retain in particular the entire antianaphylactic activity of the steroid, with more advantageous effects. They are well tolerated systemically and exert an action which is more potent and more durable than the basic steroid.

This will be demonstrated by the results of pharmacological tests given below for illustrative purposes.

1. Toxicological tests

As the other steroids of the cortisone group, compounds of formula (I) exhibit no selective toxicity whether administered orally, parenterally or topically.

In contrast to the basic steroids, such compounds have a lesser action on calcium metabolism and have also a less powerful proteocatabolic effect.

They exhibit no modifications with respect to the starting molecules and there is no elimination of potassium, sodium or water.

There results from tests of administrative of equimolecular amounts of the basic steroids and of compounds of formula (I) that the latter have a less powerful effect with respect to the experimental formation of gastric ulcer.

In particular, prednisolone 21-(ε-acetamido)-caproate, in an equimolecular amount, promotes less the formation of ulcers by ligature of the pylorus and has a less slackening effect on the reparative process of glucose-induced ulcers in rat, than prednisolone itself.

2. Tests on cortico-surrenal activity

With respect to the basic steroid, compounds of formula (I) show a more durable cortico-surrenal activity.

Evaluation by the fluorimetric method of the decrease of hematic corticosterone induced by the inhibition of the suprarenal hypophyseal carbon — an inhibition which may be considered as an indication of the tests of molecular activity — proves that compounds of formula (I) have a much more protracted action. Where prednisolone is concerned, while, after having administered several times 4 mg./kg., the plasma corticosterone level returns, after 18 hours, to the original values (30 mcg./100 ml. of plasma), after having administered equimolecular amounts of prednisolone 21-(ε-acetamido)-caproate the plasma corticosterone level is still at 20 mcg./100 ml. after 18 hours.

3. anti-inflammatory activity

The anti-inflammatory activity of compounds of formula (I) was tested with various methods:
a. the test of local carragheenin and dextrane induced oedema, and
b. the test of foreign-body-induced granuloma.

All compounds were found to be active during such tests.

In particular, the comparative study carried out with equimolecular amounts of prednisolone 21-(ε-acetamido)-caproate and of prednisolone has shown that the former has a more powerful anti-inflammatory activity. In contrast to the effect resulting from use of prednisolone, 5 mg./kg. of this compound are capable of inhibiting entirely carragheenin-induced oedema in the rat's paw.

A substantially twofold activity ratio is also found, where both these compounds are concerned, in the foreign-body-induced granuloma, since it is necessary to administer 8.5 mg. of prednisolone to obtain the same inhibitory effect than that produced by 5 mg./kg. of prednisolone 21-(ε-acetamido)-caproate.

4. Antianaphylactic activity

A more favorable rate of activity is noted with compounds of formula (I) in the cutaneous oedema in rat after intradermal introduction of immune serum.

These tests have shown, for example, that almost twofold amounts of the basic steroid should be used to obtain the same inhibitory effect produced by the new compound; for example, administration of 2 mg./kg. of prednisolone 21-($\epsilon$-acetamido)-caproate produces the same results as those obtained with 4 mg./kg. of prednisolone. This inhibitory activity of the new compound is also of much greater duration.

Bronchospasm and anaphylactic shock, induced in sensitized guinea pig by heterogeneous serum, are also more readily blocked by administration of compounds of formula (I) than by administration of the basic steroid.

Compounds of formula (I) may be administered orally, parenterally or topically and they may also be used in human therapeutics as anti-inflammatory and antianaphylactic drug.

A therapeutic composition comprises a 21-ester of steroid of aforementioned formula (I) and a pharmaceutically acceptable vehicle.

For oral or parenteral administration, the composition is formulated, for example, in the form of coated tablets, capsules, tablets and syrup, or in the form of injectable ampuls and for topical administration, it is formulated in ointment form. It may also be administered rectally, in the form of suppositories. In all cases, the active compound is associated with the usual vehicles or excipients suitable for the various pharmaceutical forms. A few nonlimiting examples of pharmaceutical formulations of the composition wherein the active compound is prednisolone 21-($\epsilon$-acetamido)-caproate, will now be given:

Example 4

Tablets, containing each 2, 4 and 8 mg. of active compound;

Example 5

Injectable ampuls containing each 20 or 30 mg. of active compound;

Example 6

Ointment containing from 0.1 to 2 percent, by weight, of active compound.

Having now described my invention, what I claim as new and desire to secure by Letters Patent is:

1. 21-esters of steroids of formula St— OCO $(CH_2)_5$—NH — $COCH_3$ wherein St represents a steroid residue from the $\Delta$1,4-pregnadiene series, the ester group being attached to the carbon at 21-position of the steroid residue.
2. Dexamethansone 21-($\epsilon$-acetamido)-caproate.
3. Triamcinolone 21-($\epsilon$-acetamido)-caproate.
4. Prednisolone 21-($\epsilon$-acetamido)-caproate.

UNITED STATES PATENT OFFICE
CERTIFICATE OF CORRECTION

Patent No. 3,609,172　　　　　　　　　Dated September 28, 1971

Inventor(s) Gianfranco Intelisano

It is certified that error appears in the above-identified patent and that said Letters Patent are hereby corrected as shown below:

On the cover sheet [32] "Oct. 21, 1968" should read -- Oct. 31, 1967 --.

Signed and sealed this 5th day of September 1972.

(SEAL)
Attest:

EDWARD M. FLETCHER, JR.　　　　　　ROBERT GOTTSCHALK
Attesting Officer　　　　　　　　　Commissioner of Patents